US009800093B2

(12) United States Patent
Sakai (10) Patent No.: US 9,800,093 B2
(45) Date of Patent: Oct. 24, 2017

(54) POWER TRANSMISSION DEVICE, WIRELESS POWER TRANSMISSION SYSTEM, AND POWER TRANSMISSION DETERMINATION METHOD

(71) Applicant: Murata Manufacturing Co., Ltd., Nagaokakyo-shi, Kyoto-fu (JP)

(72) Inventor: Hironori Sakai, Nagaokakyo (JP)

(73) Assignee: MURATA MANUFACTURING CO., LTD., Nagaokakyo-Shi, Fyoto-Fu (JP)

( * ) Notice: Subject to any disclaimer, the term of this patent is extended or adjusted under 35 U.S.C. 154(b) by 202 days.

(21) Appl. No.: 14/947,247

(22) Filed: Nov. 20, 2015

(65) Prior Publication Data

US 2016/0079812 A1    Mar. 17, 2016

Related U.S. Application Data

(63) Continuation of application No. PCT/JP2014/072678, filed on Aug. 29, 2014.

(30) Foreign Application Priority Data

Sep. 4, 2013   (JP) .................. 2013-182701

(51) Int. Cl.
  *H02J 7/00*  (2006.01)
  *H02J 17/00* (2006.01)
  *H02J 7/02*  (2016.01)
(52) U.S. Cl.
  CPC .............. *H02J 17/00* (2013.01); *H02J 7/025* (2013.01)
(58) Field of Classification Search
  CPC ....................................................... H02J 7/00
  See application file for complete search history.

(56) References Cited

U.S. PATENT DOCUMENTS 8,508,077 B2 *  8/2013  Stevens ................... H02J 5/005
                                              307/104
8,692,410 B2 *  4/2014  Schatz ................... H01Q 1/248
                                              307/104

(Continued)

FOREIGN PATENT DOCUMENTS

JP   2012-065477 A   3/2012
JP   2012-070614 A   4/2012
JP   2013-062895 A   4/2013

OTHER PUBLICATIONS

International Search Report issued for PCT/JP2014/072678, dated Nov. 4, 2014.

(Continued)

*Primary Examiner* — Hai L Nguyen
(74) *Attorney, Agent, or Firm* — Arent Fox LLP (57) ABSTRACT

The frequency of an AC voltage applied to an active electrode and a passive electrode of a power transmission device is swept and input impedance (input voltage DCV) of a power receiving device side as viewed from a DC-to-AC inverter circuit is detected for each change of the frequency of the AC voltage. A determination is made as to whether the input voltage DCV in a first frequency range determined by a resonant frequency of a series resonance circuit of the power transmission device and parallel resonance circuit of the power receiving device falls with a range of 25 mV to 450 mV, and the input voltage DCV detected in a second frequency range is equal to or lower than 100 mv. When the results of both determinations are true, power is transmitted to the power receiving device.

17 Claims, 6 Drawing Sheets

(56) References Cited

U.S. PATENT DOCUMENTS 9,199,545 B2 * 12/2015 Kim .................... B60L 11/182
2012/0049640 A1   3/2012 Ichikawa et al.
2014/0225452 A1   8/2014 Kozaki et al.

OTHER PUBLICATIONS

Written Opinion of the International Searching Authority issued for PCT/JP2014/072678, dated Nov. 4, 2014.

* cited by examiner

COMPOSITE RESONANCE

FIG. 3B

COMPOSITE RESONANCE

FIG. 3C f0      f1

FREQUENCY

POWER TRANSMISSION DEVICE, WIRELESS POWER TRANSMISSION SYSTEM, AND POWER TRANSMISSION DETERMINATION METHOD

CROSS REFERENCE TO RELATED APPLICATIONS

The present application is a continuation of PCT/JP2014/072678, filed Aug. 29, 2014, which claims priority to Japanese Patent Application No. 2013-182701, filed Sep. 4, 2013, the entire contents of each of which are incorporated herein by reference.

TECHNICAL FIELD

The present invention relates to a power transmission device, a wireless power transmission system, and a power transmission determination method that transmit electric power to a power receiving device preferably by capacitive coupling wirelessly.

BACKGROUND ART

Japanese Unexamined Patent Application Publication No. 2012-70614 (Patent Document 1) discloses a wireless power transmission system for transmitting electric power to a power receiving device using an electric field coupling technique. Power is transmitted by electric field coupling between an electrode of the power transmission device and an electrode of the power receiving device. The driving frequency of power transmission is set to enhance power transmission efficiency. This wireless power transmission system performs a frequency sweep to search for a peak resonant frequency (i.e., the resonant frequency at which the driving voltage is at a peak value) when the power receiving device is placed on the power transmission device and performs power transmission to the power receiving device at that resonant frequency.

SUMMARY OF INVENTION

The device disclosed in Patent Document 1 determines whether the power receiving is located on the power transmission device in an operative position by performing a frequency sweep and determining whether an expected peak resonant frequency is detected. If so, power transmission begins. However, power transmission will sometimes erroneously be initiated when a foreign object, such as a metal object, has been placed on the power transmission device or a power receiving device which is not compatible with the power transmission device has been placed on the power transmission device.

In this electric field coupling technique, the degree of freedom in a placement position of the power receiving device on the power transmission device is increased and transmission power is large. Accordingly, for example, the power transmission may be started when the power receiving device is placed on the power transmission device but the respective electrodes of the power transmission device and the power receiving device are not properly aligned or when a foreign object that is not a power supply target is placed on the power transmission device.

An object of the present invention is to provide a power transmission device, a wireless power transmission system, and a power transmission determination method that can more accurately determine whether to start power transmission.

According to an aspect of the invention, a power transmission device wirelessly transmits electric power to an external device including an external power transmission action unit to which an external resonance circuit is connected. The power transmission device includes a power transmission-side power transmission action unit (the power transmission coupling means) that transmits power to the external power transmission action unit (the power transmission coupling means). A power transmission-side resonance circuit is connected to the power transmission-side power transmission action unit and an alternating current (AC) generation circuit applies an AC voltage to the power transmission-side power transmission action unit through the power transmission-side resonance circuit. A frequency adjustment circuit adjusts a frequency of the AC voltage and a detection circuit detects an input impedance of the power transmission-side power transmission action unit side for each frequency of the AC voltage. A first determination unit determines whether the input impedance detected by the detection circuit in a first frequency range (which is determined by a resonant frequency of the external resonance circuit and the power transmission-side resonance circuit) falls within a predetermined impedance range. A second determination unit determines whether the input impedance detected by the detection circuit in a second frequency range (at a lower frequency side relative to the first frequency range), falls within a predetermined impedance range. A power transmission determination unit determines that power is to be transmitted when a determination result of the first determination unit is true and a determination result of the second determination unit is true.

With this configuration, a determination is made as to whether the device placed on the power transmission device is a compatible device (i.e., a device designed to receiving wireless power transmission from the power transmission device) by determining whether the detected input impedance in each of the two frequency ranges has an appropriate value. For example, in the case where a metal object is placed on the power transmission device, the input impedance detected in the first frequency range will fall within the predetermined range but the input impedance detected in the second frequency range will not fall within the predetermined range and it will be determined that the object placed on the power transmission device is not a compatible device to which power should be transmitted. When it is determined that the object placed on the power transmission device is not a compatible device to which power should be transmitted, the power transmission device does not start power transmission. Thus, the power transmission device can more accurately determine whether to start power transmission, thereby performing the power transmission more safely.

In the power transmission device according to one aspect of the invention, it is preferable that the external power transmission action unit be a first external electrode and a second external electrode, the power transmission-side power transmission action unit be a power transmission-side first electrode which opposes and makes capacitance coupling to the first external electrode and a power transmission-side second electrode which opposes and makes capacitance coupling to or is directly connected with the second external electrode, and the AC generation circuit apply the AC voltage to the power transmission-side first electrode and the power transmission-side second electrode.

With this configuration, it is possible to accurately determine whether power transmission should begin, thereby performing power transmission more safely.

In the power transmission device according to another aspect of the invention, it is preferable that the AC generation circuit include a direct current to alternating current (DC-to-AC) conversion circuit which converts a DC voltage to an AC voltage, and the detection circuit detect input impedance at a time when the external power transmission action unit side is viewed from an input side of the DC-to-AC conversion circuit.

In the power transmission device according to yet another aspect of the invention, it is preferable that a third determination unit which determines whether or not the input impedance detected by the detection circuit in a third frequency range which lies between the first frequency range and the second frequency range falls within a predetermined impedance range, and the power transmission determination unit determines that power should be transmitted when the determination result of the first, second and third determination units are true.

With this configuration, it is possible to determine whether the device placed on the power transmission device is a compatible device to which power should be transmitted by determining whether the detected input impedance in the third frequency range, in addition to the first frequency range and the second frequency range, has an appropriate value. With this, the power transmission device can appropriately determine whether to start power transmission, thereby performing the power transmission more safely.

In the power transmission device according to a further aspect of the invention, it is preferable that a fourth determination unit, which determines whether or not the input impedance detected by the detection circuit in a fourth frequency range located on a higher frequency side relative to the first frequency range, falls within a predetermined impedance range, and the power transmission determination unit determines that power should be transmitted when the determination result of the first, second and fourth determination units are true.

With this configuration, it is possible to determine whether the device placed on the power transmission device is a compatible device to which power should be transmitted by determining whether the detected input impedance in the fourth frequency range, in addition to the first, second and third frequency ranges has an appropriate value. With this, the power transmission device can determine whether to begin power transmission more appropriately, thereby performing the power transmission more safely.

In the power transmission device according to yet a further aspect of the invention, it is preferable that a third determination unit, which determines whether or not the input impedance detected by the detection circuit in a third frequency range located between the first frequency range and the second frequency range falls within a predetermined impedance range, and a fourth determination unit which determines whether or not the input impedance detected by the detection circuit in a fourth frequency range located at a higher frequency than the first frequency range, falls within a predetermined impedance range, and the power transmission determination unit determine that power should be transmitted when the determination result of the first, second, third and fourth determination units are true.

With this configuration, it is determined whether or not the device placed on the power transmission device is a target device to which power is to be transmitted by determining whether the detected input impedance in the third and fourth frequency ranges, in addition to the first and second frequency ranges, have an appropriate value. With this, it is possible to more appropriately determine whether to start the power transmission, thereby performing the power transmission more safely.

In the power transmission device according to a further aspect of the invention, it is preferable that the second frequency range be half the first frequency range in frequency values.

With this configuration, when the device placed on the power transmission device includes the external resonance circuit, a waveform having a maximum value appears in the first frequency range. This waveform is a waveform caused by the composite resonance generated between the power transmission-side resonance circuit and the external resonance circuit. Therefore, the waveform having the maximum value does not appear in the second frequency range which is half the first frequency range. As a result, whether or not the device placed on the power transmission device is a compatible device to which power is transmitted can be determined.

In the power transmission device according to a further aspect of the invention, it is preferable that the second determination unit determine whether the input impedance detected by the detection circuit in the second frequency range is equal to or lower than a specified threshold value.

In the power transmission device according to yet a further aspect of the invention, it is preferable that the third determination unit determine whether the input impedance detected by the detection circuit in the third frequency range is equal to or lower than a specified threshold value.

In the power transmission device according to a further aspect of the invention, it is preferable that the fourth determination unit determine whether the input impedance detected by the detection circuit in the fourth frequency range is equal to or lower than a specified threshold value.

According to the present invention, the power transmission device can determine whether to start power transmission appropriately and power can be transmitted to the power receiving device from the power transmission device more safely.

In accordance with a further aspect of the invention, a power transmission device for wirelessly transmitting electric power to an external device of the type which includes a first resonance circuit and first power coupling means coupled to the first resonance circuit, the power transmission device comprising second power coupling means for transmitting power to the external device via the first power coupling means, a second resonance circuit connected to the second power coupling means, an alternating current generation circuit that applies an AC voltage to the second power coupling means through the resonance circuit for transmission of power to the external device, and a controller. The controller varies the frequency of the AC voltage generated by the alternating current generation circuit over a predetermined frequency range including a first frequency range determined by the resonant frequency of the first and second resonance circuits and a second frequency range that is below the first frequency range. The controller further causes power to be applied to the external device via the second power coupling means when an input impedance of the second coupling means, as viewed from an input side of the alternating current generation circuit, meets predetermined criteria including the fact that the input impedance falls within first and second impedance ranges for the first and second frequency ranges, respectively.

In yet a further aspect of the invention, the predetermined frequency range further includes a third frequency range located between the first and second frequency ranges; and the predetermined criteria includes the fact that the input impedance falls within first, second and third impedance ranges for the first, second and third frequency ranges, respectively.

In yet a further aspect of the invention, the predetermined frequency range includes a fourth frequency range located above the first frequency range, and the predetermined criteria includes the fact that the input impedance falls within first, second, third and fourth impedance ranges for the first, second, third and fourth frequency ranges, respectively.

In yet a further aspect of the invention, a center frequency value of the second frequency range is half a center frequency value of the first frequency range.

In yet a further aspect of the invention, the second impedance range is between zero a specified threshold value.

In yet a further aspect of the invention, the third impedance range is between zero a specified threshold value.

In yet a further aspect of the invention, the second and third impedance ranges are both between zero and the same specified value.

In yet a further aspect of the invention, the second, third and fourth impedance ranges are all between zero and the same specified value.

In yet a further aspect of the invention, the maximum value of the input impedance occurs in the first frequency range when a compatible power receiving device is placed in an operative position relative to the power transmission device.

In yet a further aspect of the invention, the predetermined criteria are met when a compatible external device is placed in an operative position relative to the power transmission device.

In yet a further aspect of the invention, the predetermined criteria includes the fact that the maximum value of the input impedance occurs in the first frequency range.

In yet a further aspect of the invention, the first power coupling means of the external device comprise first and second electrodes, and the second power coupling means of the power transmission device comprises third and fourth electrodes adapted to make a capacitive coupling with the first and second electrodes of the external device when the external device is placed in an operative position relative to the power transmission device.

In yet a further aspect of the invention, the alternating current generation circuit includes a direct current to alternating current (DC-to-AC) conversion circuit.

In yet a further aspect of the invention, a wireless power transmission system includes an external power receiving device including a first resonance circuit and first power coupling means coupled to the first resonance circuit, and a power transmission device including a second power coupling means for transmitting power to the external device via the first power coupling means, a second resonance circuit connected to the second power coupling means, an alternating current generation circuit that applies an AC voltage to the second power coupling means through the resonance circuit for transmission of power to the external device; and a controller. The controller varies the frequency of the AC voltage generated by the alternating current generation circuit over a predetermined frequency range including a first frequency range determined by the resonant frequency of the first and second resonance circuits and a second frequency range that is below the first frequency range. The controller causes power to be applied to the external device via the second power coupling means when an input impedance of the second coupling means, as viewed from an input side of the alternating current generation circuit, meets predetermined criteria including the fact that the input impedance falls within first and second impedance ranges for the first and second frequency ranges, respectively.

The present invention also includes a method for determining when to transmit power from a power transmission device to a power receiving device, the power receiving device having a first resonance circuit and first power coupling means coupled to the first resonance circuit, the power transmission device having a second power coupling means for transmitting power to the power receiving device via the first power coupling means and an alternating current generation circuit that applies an AC voltage to the second power coupling means through the resonance circuit for transmission of power to the external device. The method comprises varying the frequency of the AC voltage generated by the alternating current generation circuit over a predetermined frequency range including a first frequency range determined by the resonant frequency of the first and second resonance circuits and a second frequency range that is below the first frequency range, and causing power to be applied to the external device via the second power coupling means when an input impedance of the second coupling means, as viewed from an input side of the alternating current generation circuit, meets predetermined criteria including the fact that the input impedance falls within first and second impedance ranges for the first and second frequency ranges, respectively.

DESCRIPTION OF THE PREFERRED EMBODIMENTS

Figure 1:
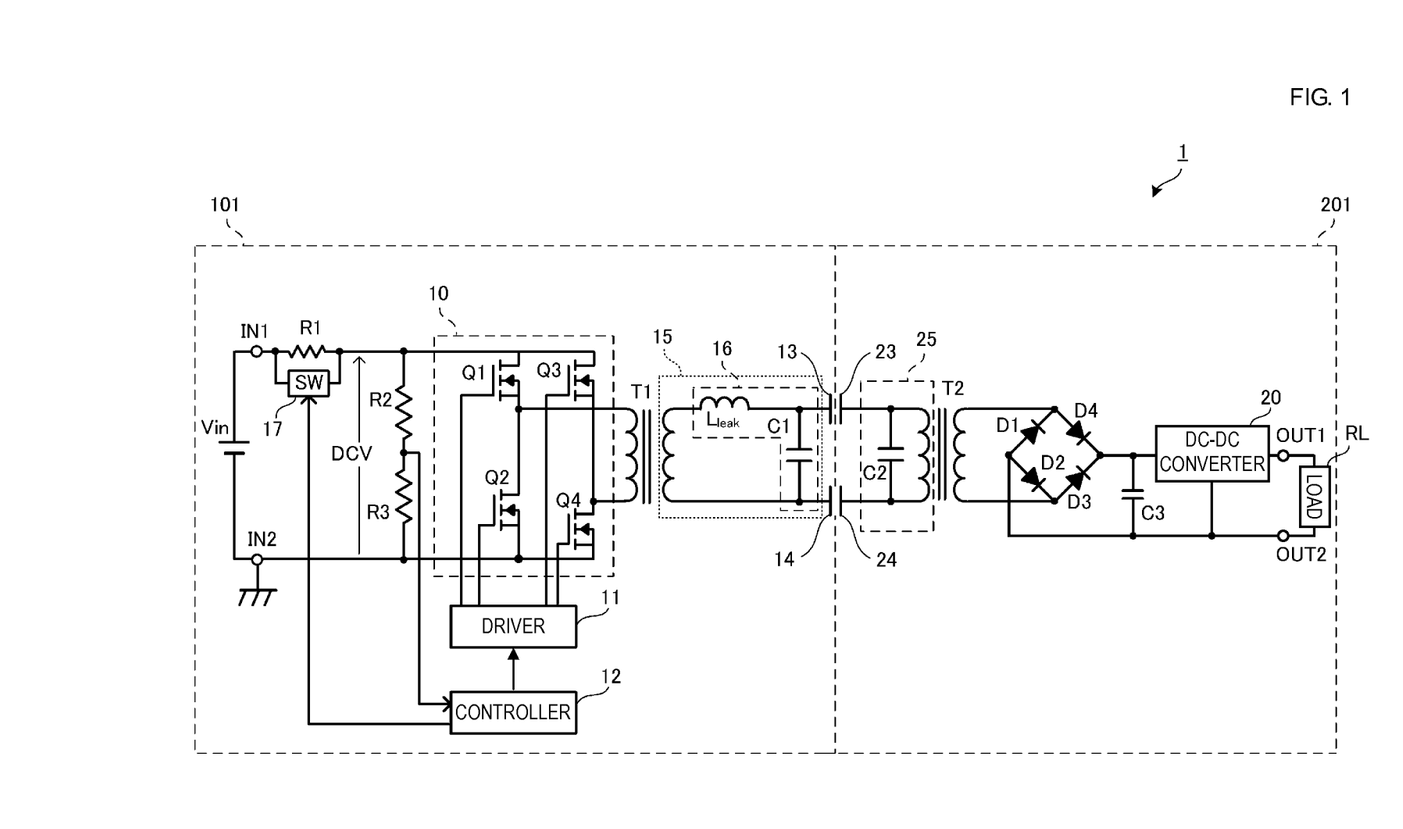
FIG. 1 is a circuit diagram of a wireless power transmission system according to an embodiment of the invention.

FIG. 1 is a circuit diagram of a wireless power transmission system according to one embodiment of the present invention. The wireless power transmission system 1 includes a power transmission device 101 and a power receiving device 201. The power receiving device 201 includes a load circuit RL comprising a secondary battery and a charging circuit. The power receiving device 201 is, for example, a mobile electronic device such as a cellular phone, a personal digital assistant (PDA), a mobile music player, a notebook type personal computer (PC), and a digital camera. When power receiving device 201 is placed on the power transmission device 101 in an operative position, the power transmission device 101 charges the secondary battery of the power receiving device 201.

Although the load circuit RL is provided in the power receiving device 201 in FIG. 1, the load circuit RL may be provided outside of the power receiving device 201 and may be a circuit that can be attached to and detached from the power receiving device 201.

A DC voltage Vin is connected to input terminals IN1 and IN2 of the power transmission device 101. The DC voltage Vin preferably supplied by an AC adapter. The AC adapter is connected to a commercial power supply and converts an AC voltage of, for example, 100 V to 230 V to a DC voltage of, for example, 5 V or 12 V.

A DC-to-AC inverter circuit 10, formed by switch elements Q1, Q2, Q3, and Q4, is connected to the input terminals IN1 and IN2 of the power transmission device 101 and functions as a DC-to-AC conversion circuit. The switch elements Q1, Q2, Q3, and Q4 are preferable n-type MOSFETs. The switch elements Q1 and Q2 are connected in series and the switch elements Q3 and Q4 are connected in series. Furthermore, a primary coil of a step up transformer T1 is connected to a connection point between the switch elements Q1 and Q2 and a connection point between the switch elements Q3 and Q4. The step up transformer T1 increases an AC voltage converted from the DC voltage Vin.

The switch elements Q1, Q2, Q3, and Q4 are preferably PWM-controlled by a driver 11. The driver 11 alternately turns the switch elements Q1 and Q4 and the switch elements Q2 and Q3 ON and OFF in accordance with a control signal from a controller 12 which is preferably a programmed microprocessor but can also be for example an ASIC, an IC or a DSP. The switch elements Q1 and Q4 and the switch elements Q2 and Q3 are turned ON and OFF alternately, so that the DC-to-AC inverter circuit 10 converts the DC voltage Vin to the AC voltage.

An impedance switching circuit formed by a resistor R1 and a bypass switch 17 is connected to the input terminal IN1 in order to supply either a constant current or a constant voltage to the DC-to-AC inverter circuit 10. The bypass switch 17 is closed and opened (i.e., turned ON and OFF) by the controller 12. When the bypass switch 17 is in the closed state, a constant voltage is applied to the DC-to-AC inverter circuit 10. When the bypass switch 17 is in an opened state, a substantially constant current is supplied to the load circuit RL because the resistor R1 has an impedance which is significantly larger than the impedance on the load circuit RL side.

Voltage-dividing resistors R2 and R3, which are used for voltage detection, are connected to the input terminals IN1 and IN2. The controller 12 detects an input voltage DCV from the voltage-dividing resistors R2 and R3 and determines whether the power receiving device 201 has been placed on the power transmission device 101 in an operative position based on the input voltage DCV detected when the bypass switch 17 is opened and the constant current is supplied to the DC-to-AC inverter circuit 10. Based on this determination, the controller 12 determines whether power transmission is to be started. The controller 12 sets a driving frequency for power transmission based on the detected input voltage DCV and switches the switch elements Q1 to Q4 on and off at the set frequency. The controller 12, which is described in further detail below, PWM-controls the switch elements Q1 to Q4 using the driver 11 so as to adjust transmission power.

The voltage detection circuit comprising the voltage-dividing resistors R2 and R3 is preferably provided at the input side of the DC-to-AC inverter circuit 10. As a result, the input voltage DCV can be detected without being influenced by switching of the DC-to-AC inverter circuit 10 or the step up transformer T1. It should be noted, however, that the voltage detection circuit may alternatively be provided at the output side of the DC-to-AC inverter circuit 10 or may be provided at the secondary side of the step up transformer T1.

An active electrode 13 and a passive electrode 14 are connected to a secondary coil of the step up transformer T1. The active electrode 13 is a power transmission-side first electrode and the passive electrode 14 is a power transmission-side second electrode. An AC voltage is increased by the step up transformer T1 is applied to the active and passive electrodes 13 and 14.

A capacitor C1 is connected in parallel to the secondary coil of the step up transformer T1 and the capacitor C1 forms a parallel resonance circuit 15 together with the secondary coil of the step up transformer T1. Furthermore, the capacitor C1 forms a series resonance circuit 16 together with a leakage inductance $L_{leak}$ (or an inductor as a real component) of the secondary coil of the step up transformer T1. The capacitor C1 may be a discrete component or may be a parasitic capacitance that is generated on the secondary coil.

The power receiving device 201 includes an active electrode 23 and a passive electrode 24. The active electrode 23 is a first external electrode and a power receiving-side first electrode according to the present invention and the passive electrode 24 is a second external electrode and a power receiving-side second electrode according to the present invention. The active electrode 23 and the passive electrode 24 have dimensions that are substantially the same as the dimensions of the active electrode 13 and the passive electrode 14, respectively. When the power receiving device 201 is placed on the power transmission device 101, the active electrode 23 and the passive electrode 24 oppose the active electrode 13 and the passive electrode 14, respectively, with spaces interposed there between. Alternatively, the passive electrodes 14 and 24 may make direct contact with each other. A voltage is applied between the active electrode 13 and the passive electrode 14 so as to generate an electric field between the active electrodes 13 and 23 when they are arranged in an opposing manner. Then, power is transmitted to the power receiving device 201 from the power transmission device 101 through the electric field.

A primary coil of a step-down transformer T2 is connected to the active electrode 23 and the passive electrode 24 of the power receiving device 201. A capacitor C2 is connected in parallel to the primary coil. The capacitor C2 forms a parallel resonance circuit 25 together with an excitation inductance of a secondary coil of the step-down transformer T2.

The series resonance circuit 16 of the power transmission device 101 and the parallel resonance circuit 25 of the power receiving device 201 are preferably set to have substantially the same resonant frequency so that power transmission can be performed efficiently. When the power receiving device 201 is placed on the power transmission device 101 in an operative position, the resonance circuits 16 and 25 resonate in a coupled manner (composite resonance). Although details will be described below, the driving frequency in the power transmission to the power receiving device 201 from the power transmission device 101 is preferably defined to be a frequency close to the resonant frequency of the series resonance circuit 16 and the parallel resonance circuit 25.

A diode bridge formed by diodes D1, D2, D3, and D4 is connected to the secondary coil of the step-down transformer T2. One output of the diode bridge is connected to an output terminal OUT1 with a smoothing capacitor C3 and a DC-DC converter 20 interposed therebetween. The other output of the diode bridge is connected to an output terminal OUT2. The secondary battery load circuit RL (which can be, for example, a charging circuit or another load circuit) are connected to the output terminals OUT1 and OUT2. The diode bridge and the smoothing capacitor C3 operate as rectifying and smoothening circuits and rectify and smoothen an AC voltage that has been stepped down by the step-down transformer T2. The rectified and smoothened DC voltage is converted to a stabilized predetermined voltage by the DC-DC converter 20.

In the wireless power transmission system 1 configured as described above, the controller 12 of the power transmission device 101 detects whether the power receiving device 201 is placed at an operative position on the power transmission device 101. An operative position is one where power can be transmitted to the power receiving device 201 from the power transmission device 101 safely and the active electrode 13 and the passive electrode 14 of the power transmission device 101 and the active electrode 23 and the passive electrode 24 of the power receiving device 201 oppose each other, respectively. For example, if the active electrode 13 of the power transmission device 101 and the passive electrode 24 of the power receiving device 201 oppose each other, the controller 12 determines that the power receiving device 201 is not placed at an operative position where power can reliably be transmitted to the power receiving device.

Furthermore, the controller 12 also determines whether a compatible power receiving device 201 has been placed on the power transmission device 101 or whether foreign matter, such as a metal piece, has been placed on the power transmission device 101. A compatible power receiving device is, for example, one where the circuit constants of the parallel resonance circuit 25 of the power receiving device 201 are set to have the same frequency as that of the series resonance circuit 16 of the power transmission device 101, and the material, shape or the like of the active electrode 23 or the passive electrode 24 of the power receiving device 201 meet predefined criteria.

When the controller 12 determines that a compatible power receiving device 201 has been placed in an operable position, it sets the driving frequency for transmitting power to the power receiving device 201. The driving frequency is the resonant frequency of the resonance circuits 16 and 25 resonating in the coupled manner (composite resonance). Operations that are performed by the controller 12 will now be described.

First, a placement positional relationship (operable position) of the power receiving device 201 and the power transmission device 101 is described.

Figure 2A:
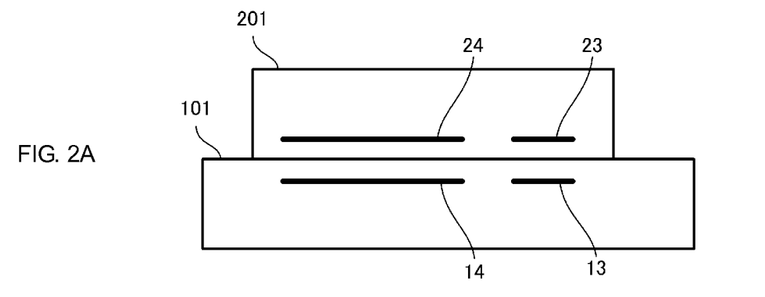
FIGS. 2A, 2B and 2C are views for explaining a positional relationship of a power receiving device and a power transmission device.
Figure 2B:
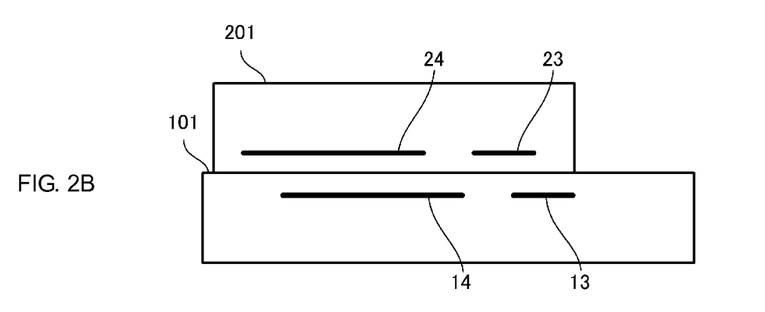
Figure 2C:
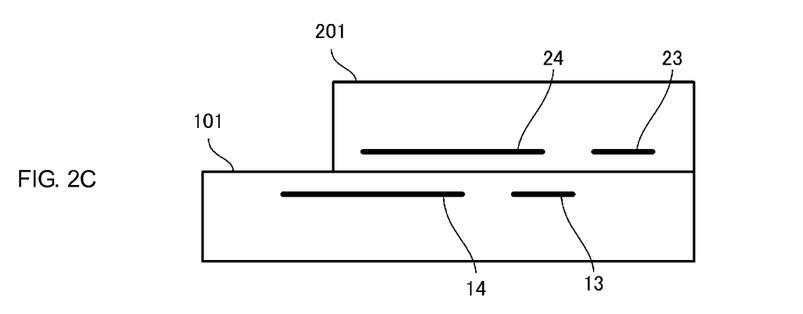

FIGS. 2A-2C are views for explaining the operative position of the power receiving device 201 relative to the power transmission device 101. Whether or not power transmission is initiated is determined by determining whether the power receiving device 201 is placed in the operative position on the power transmission device 101. FIG. 2A and FIG. 2B illustrate states where the power receiving device 201 is placed in two different operative positions on the power transmission device 101. In FIG. 2A, the power receiving device 201 is placed on the power transmission device 101 at a position where the active electrode 23 and the passive electrode 24 are directly opposed to the active electrode 13 and the passive electrode 14, respectively. Hereinafter, this position is referred to as a regular position. In FIG. 2B, the power receiving device 201 is placed on the power transmission device 101 at a position where the active electrode 23 and the passive electrode 24 are partially opposed to (partially overlapping) the active electrode 13 and the passive electrode 14, respectively.

FIG. 2C illustrates a state where the power receiving device 201 is placed on the power transmission device 101 at a location outside of the operable position. In the wireless power transmission system 1 using the electric field coupling technique, the passive electrodes 14 and 24 are preferably made to have dimensions which are larger than those of the active electrodes 13 and 23 and a voltage on the active electrodes 13 and 23 is higher than that on the passive electrodes 14 and 24. Therefore, when the power receiving device 201 is placed in the position illustrated in FIG. 2C where both the active electrode 13 and the passive electrode 14 oppose the passive electrode 24 of the power receiving device 201, an unnecessary capacitance (which does not contribute to power transmission) is formed between the active electrode 13 and the passive electrode 14 through the passive electrode 24.

Next, a method for detecting the relative placement position of the power receiving device 201, a method of detecting whether a compatible power receiving device 201 has been placed in the operative position on the power transmission device 201, and a method of detecting whether an object other than the power receiving device 201 has been placed on the power transmission device 101, will be described.

Figure 3A:
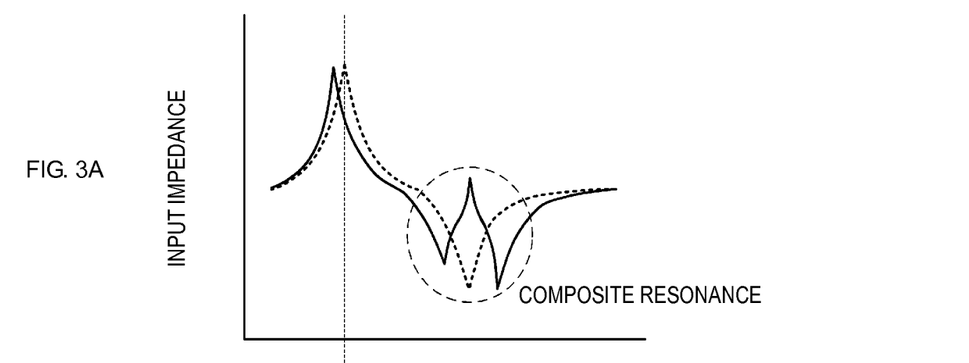
FIGS. 3A, 3B and 3C are views illustrating frequency characteristics of an input impedance in the power transmission device.
Figure 3B:
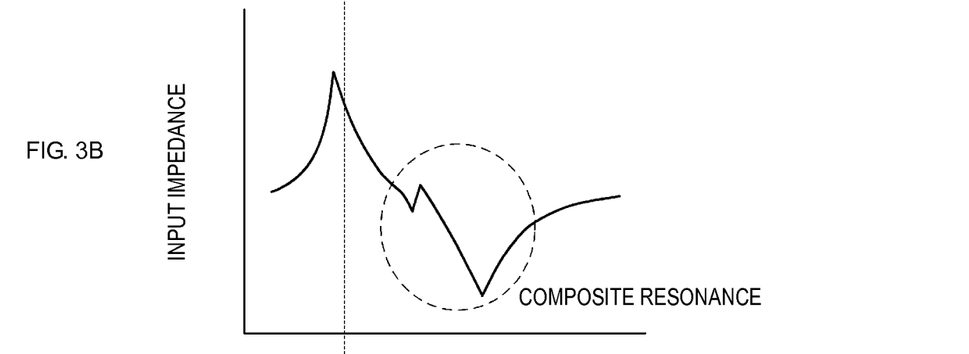
Figure 3C:
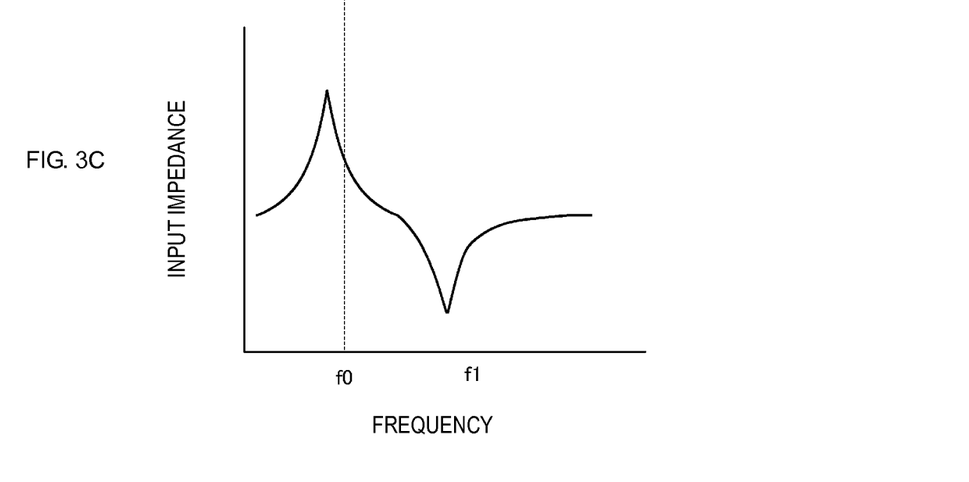

FIGS. 3A-3C are views illustrating the frequency characteristics of the input impedance in the power transmission device 101 at a time when the active electrode 13 side and the passive electrode 14 side are viewed from the DC-to-AC inverter circuit 10. Although the actual frequency characteristics are complex, FIGS. 3A-3C illustrates them in a simplified manner for the convenience of description.

The waveform indicated by a dashed line in FIG. 3A illustrates the frequency characteristics of the input impedance (in the preferred embodiment measured at the input side of DC-to-AC inverter circuit 10) before the power receiving device 201 has not been placed on the power transmission device 101. In the waveform, peaks (maximum value and minimum value) appear at a resonant frequency f0 of the parallel resonance circuit 15 of the power transmission device 101 and a resonant frequency f1 of the series resonance circuit 16 thereof.

The waveform indicated by a solid line in FIG. 3A expresses the frequency characteristics of the input impedance when a compatible power receiving device 201 is placed at the regular position on the power transmission device 101. In this waveform, the series resonance circuit 16 of the power transmission device 101 and the parallel resonance circuit 25 of the power receiving device 201 are coupled and a plurality of frequency peaks resulting from composite resonance appear in the vicinity of the frequency f1 (within a circle indicated by a dashed line in the drawing).

The waveform illustrated in FIG. 3B shows the frequency characteristics of the input impedance when a compatible power receiving device 201 is placed on the power transmitting device 101 at a non-operable position. In this case, the active electrode 13 of the power transmission device 101 and the passive electrode 24 of the power receiving device 201 partially oppose/overlap each other as described above with reference to FIG. 2C. As a result, the series resonance circuit 16 and the capacitance defined by the active electrode 13 and the passive electrode 24 are connected in parallel with the capacitor C1 so that the overall capacitance varies. This causes the resonant frequency to vary and the frequency peaks resulting from the composite resonance change are as shown by the waveform in FIG. 3B.

The waveform illustrated in FIG. 3C illustrates the frequency characteristics of the input impedance when a metal object is placed on the power transmission device 101 at a position which opposes both the active electrode 13 and the passive electrode 14. As a result, a capacitance is formed between the active electrode 13 and the passive electrode 14 of the power transmission device 101 through the metal object. Accordingly, in the series resonance circuit 16, capacitance by the active electrode 13 and the passive electrode 24 is connected to the capacitor C1 in parallel so that the capacitance is increased. That is to say, the resonant frequency is lowered and the frequency characteristics of the input impedance has a waveform shifted from the waveform indicated by the dashed line in FIG. 3A to the lower-frequency side as illustrated in FIG. 3C.

As described above, the controller 12 can determine whether the power receiving device 201 is placed in an operative position on the power transmission device 101, is placed in an inoperable position on the power transmission device 101 or that a foreign object, such as a metal object, is placed on the power transmission device 101 based on the frequency characteristics of the input impedance.

Figure 4:
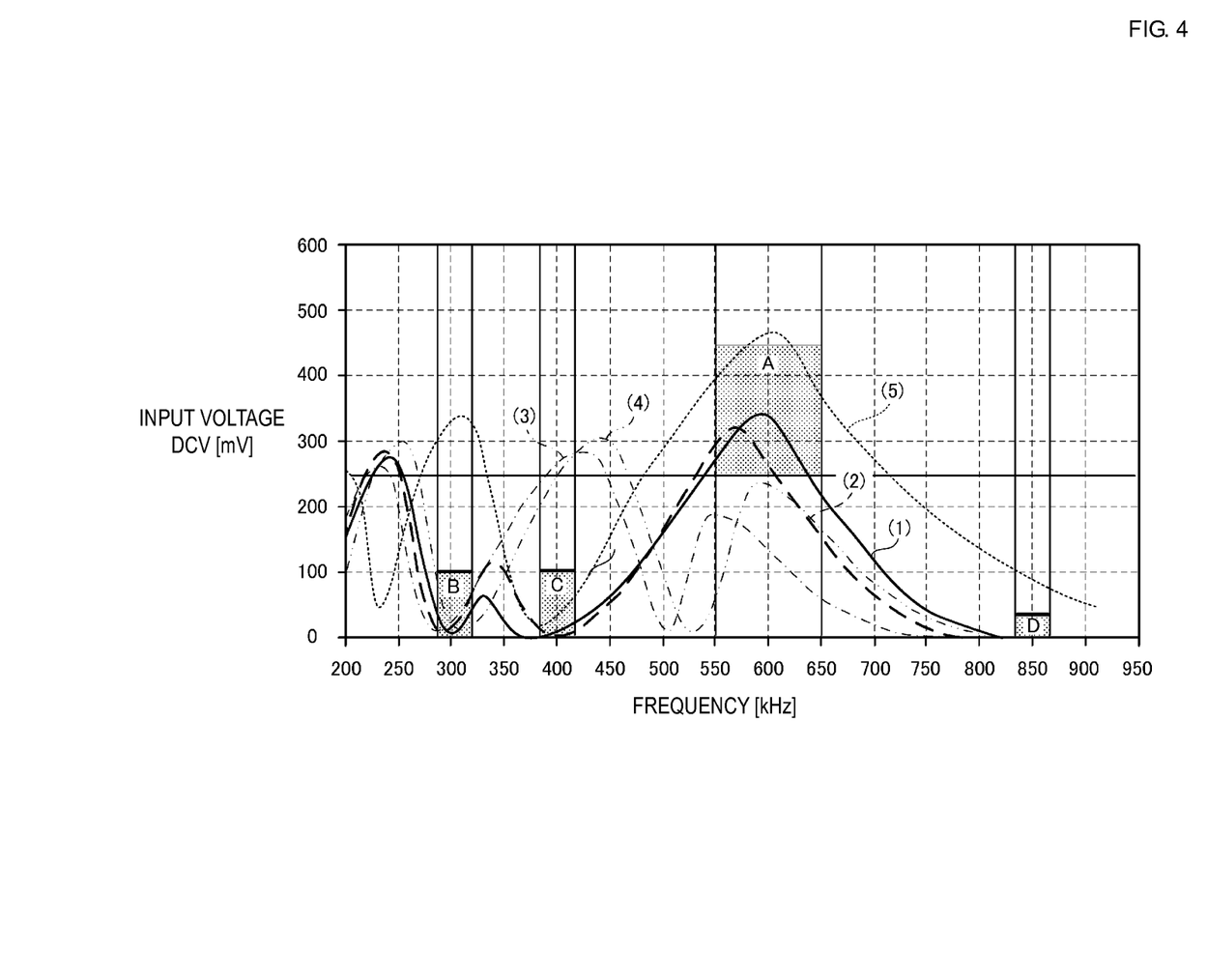
FIG. 4 is a graph illustrating waveforms of frequency characteristics of input voltages DCV.

FIG. 4 illustrates waveforms of the frequency characteristics of the input voltage DCV under different conditions. The input voltage is related to the input impedance by ohms law. The input current will be a constant current of known value when switch 17 is open (in the OFF state).

The controller 12 determines whether the detected input voltage DCV is within a predetermined range at a first frequency range (region A in FIG. 4) and a second frequency range (region B in FIG. 4) and determines that a compatible power receiving device 201 has been placed in an operative position on the power transmission device 101 when both the conditions are satisfied. Since the value of the input voltage DCV is indicative of the input impedance of the electrodes 13,14 as viewed from the input side of the inverter circuit 10, the input voltage DCV provides an indication of the input voltage.

The first frequency range and the second frequency range are defined by the resonant frequency of the composite resonance. In this example, circuit constants of the series resonance circuit 16 of the power transmission device 101 and the parallel resonance circuit 25 of the power receiving device 201 are set so that the resonant frequency of the composite resonance is 600 kHz (±50 kHz). In this case, the first frequency range is 600 kHz (±50 kHz) and the second frequency range is 300 kHz (±25 kHz) which is half the first frequency range. The input voltage DCV takes a maximum value in a range of approximately 250 mV to 450 mV in the first frequency range. Throughout the second frequency range, at least a part of the input voltage DCV takes a value of equal to or lower than approximately 100 mV.

The waveforms (1) and (2) in FIG. 4 show the frequency characteristics when a compatible power receiving device 201 is placed in an operative position on the power transmission device 101. In each of the waveform and the waveform, the input voltage DCV takes a maximum value in the range between 250 mV to 450 mV in the first frequency range (region A) and the input voltage DCV takes a value equal to or lower than 100 mV at the second frequency range (region B). That is to say, the conditions are satisfied at both of the first frequency range (region A) and the second frequency range (region B). Accordingly, the controller 12 determines that power transmission to the power receiving device 201 from the power transmission device 101 should begin.

Waveforms (3) and (4) in FIG. 4 illustrate frequency characteristics when a compatible power receiving device 201 is placed at an inoperative position on the power transmission device 101 and when an incompatible power receiving device 201 is placed at an operable position on power transmission device 101, respectively. In each case, the condition is satisfied at the second frequency range (region B) but not at the first frequency range (region A). Accordingly, the controller 12 determines that power transmission to the power receiving device 201 from the power transmission device 101 should not begin.

A waveform (5) in FIG. 4 shows the frequency characteristics when the power receiving device 201 is not properly placed on the power transmission device 101. In this case, the condition is not satisfied at either the first frequency range (region A) or the second frequency range (region B). Accordingly, the controller 12 determines that power transmission to the power receiving device 201 from the power transmission device 101 should not commence.

A third frequency range (region C in FIG. 4) located between the first frequency range and the second frequency range may also be considered. In this case, whether or not a compatible power receiving device 201 has been placed in an operative position on the power transmission device 101 is further determined by determining whether at least a part of the detected input voltage DCV in the third frequency range is equal to or lower than a threshold value of 100 mV. The third frequency range is a frequency between the first frequency range and the second frequency range at which the input voltage DCV takes a minimum value. In this example, the third frequency range is approximately 400 kHz (±25 kHz). Furthermore, the input voltage DCV takes a minimum value of equal to or lower than approximately 100 mV in the third frequency range.

In each of the cases of the waveform (1) and the waveform (2) in FIG. 4, the input voltage DCV takes a maximum value in the range of 250 mV to 450 mV at the first frequency range (region A) and the input voltage DCV takes a value of equal to or lower than 100 mV at both the second frequency range (region B) and the third frequency range (region C). That is to say, the conditions are satisfied at each of the three frequency ranges. Accordingly, the controller 12 determines that power transmission to the power receiving device 201 from the power transmission device 101 should begin.

In each of the cases of the waveforms (3) and (4) in FIG. 4, the condition is satisfied at the second frequency range (region B) but not at either the first frequency range (region A) or the third frequency range (region C). Accordingly, the controller 12 determines that power transmission to the power receiving device 201 from the power transmission device 101 should not begin.

In the case of the waveform (5) in FIG. 4, the condition is satisfied in the third frequency range (region C) but not at either the first frequency range (region A) or the second frequency range (region B). Accordingly, the controller 12 determines that power transmission to the power receiving device 201 from the power transmission device 101 should not begin.

A fourth frequency range (region D) located at a higher frequency side relative to the first frequency range may also be considered. In this case, whether or not at least a part of the detected input voltage DCV falls within a predetermined range at the fourth frequency is determined in addition to the determination conditions at the first frequency and the second frequency. The system determines that a compatible power receiving device 201 has been placed on the power transmission device 101 in an operative position when all four conditions are satisfied. The fourth frequency range is a frequency located at the higher frequency side relative to the first frequency range at which the input voltage DCV takes a value close to approximately 0 mV when a compatible power receiving device 201 is placed at the regular position on the power transmission device 101. When an incompatible power receiving device is placed on the power transmission device 101 or when a foreign object such as a metal piece is mounted thereon, the input voltage DCV at the fourth frequency range (region D) is sometimes equal to or higher than a set value. In such a case, a determination can be made with higher accuracy.

It should be noted that the controller 12 may determine whether the detected input voltage DCV at each of the first, second, third and fourth frequency ranges is within the corresponding predetermined range and can use part or all of this information to determine whether a compatible power receiving device 201 has been placed on the power transmission device 101 in an operable position.

Figure 5:
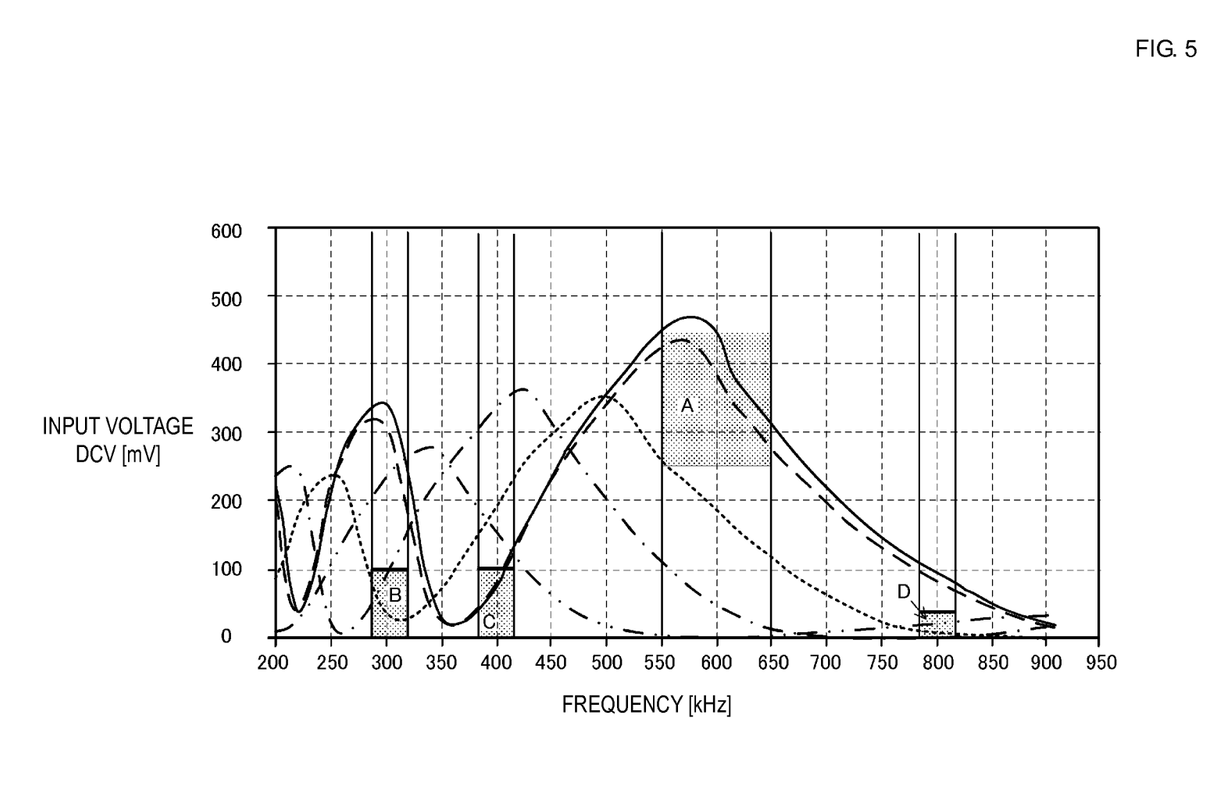
FIG. 5 is a graph illustrating waveforms of frequency characteristics of input voltages DCV when a metal piece is placed on the power transmission device.

FIG. 5 is a view illustrating the frequency characteristics of the input voltages DCV when a metal object is placed on the power transmission device 101. As can be seen, none of the waveforms satisfy the conditions at each of the first frequency range (region A), the second frequency range (region B), and the third frequency range (region C). Accordingly, the controller 12 determines that power transmission to the power receiving device 201 from the power transmission device 101 should not begin.

As described above, the controller 12 can determine whether power transmission should begin based on the input voltage DCV at each of the first frequency range, the second frequency range, the third frequency range, and the fourth frequency range. Next, a process executed by the controller 12 will be described.

Figure 6:
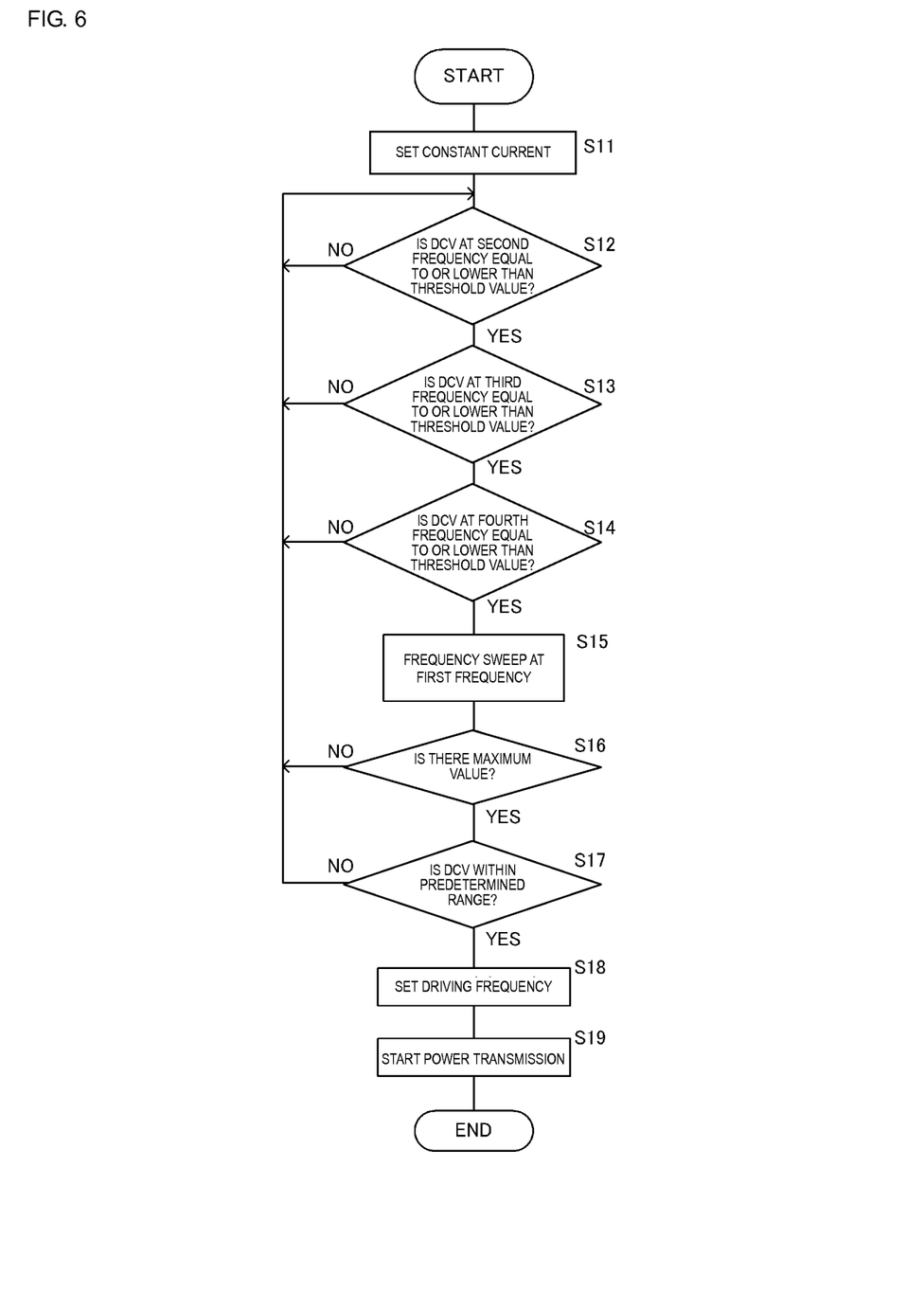
FIG. 6 is a flowchart of a process executed by a controller.

FIG. 6 is a flowchart of the process executed by the controller 12.

The controller 12 turns OFF (opens) the bypass switch 17 to provide a constant current to the DC-to-AC inverter circuit 10 (S11). The controller 12 detects the input voltage DCV in the second frequency range (region B in FIG. 4) and determines whether the input voltage DCV is equal to or lower than a threshold value (100 mV) (S12) in this range. Preferably, the controller 12 detects the input voltage DCV within a band of ±25 kHz from the center frequency 300 kHz.

When the input voltage DCV is higher than the threshold value (100 mV) (NO; at S12), the controller 12 determines that either a compatible power receiving device 201 has not been placed on the power transmission device 101, a compatible power receiving device 201 has been placed on the power transmission device 101 but not at an operable position or a foreign object such as a metal piece has been placed on the power transmission device 101 and subsequently executes processing at S12 again. The power transmission device 101 may be in a standby state for a predetermined period of time until another power receiving device is placed thereon. Alternatively, the user may be notified of the error.

When the input voltage DCV in the second frequency range is equal to or lower than the threshold value (100 mV) (YES; at S12), the controller 12 detects the input voltage DCV in the third frequency range (region C in FIG. 4) and determines whether the input voltage DCV is equal to or lower than a second threshold value (100 mV) (S13). Preferably, in the same manner as the processing at S12, the controller 12 detects whether the input voltage DCV is within a band of ±25 kHz from the center frequency 400 kHz.

When the input voltage DCV is higher than the second threshold value (100 mV) (NO; at S13), the controller 12 determines that a compatible power receiving device 201 has not been placed on the power transmission device 101, a compatible power receiving device 201 has been placed on the power transmission device 101 but not in an operable position, or a foreign object such as a metal piece has been placed on the power transmission device 101 and the process returns to the processing at S12.

When the input voltage DCV in the third frequency range is equal to or lower than the second threshold value (100 mV) (YES; at S13), the controller 12 detects the input voltage DCV in the fourth frequency range (region D in FIG. 4) and determines whether the input voltage DCV is equal to or lower than a third threshold value (50 mV) (S14). Preferably, in the same manner as the processing at S12 and S13, the controller 12 detects whether the input voltage DCV is within a band of ±25 kHz from the center frequency 850 kHz and determines whether the input voltage DCV is equal to or lower than the third threshold value (50 mV).

When the input voltage DCV is higher than the third threshold value (50 mV) (NO; at S14), the controller 12 determines that either a compatible power receiving device 201 has not been placed on the power transmission device 101, a compatible power receiving device has been placed on the power transmission device 101 but not in an operative position, or a foreign object such as a metal piece has been placed on the power transmission device 101 and the process returns to the processing at S12.

When the input voltage DCV in the fourth frequency range is equal to or lower than the third threshold value (50 mV) (YES; at S14), the controller 12 sets a frequency range in which sweeping is to be performed to the first frequency range (region A in FIG. 4) and drives the DC-to-AC inverter circuit 10 at the set frequency so as to sweep the frequency of the AC voltage that is applied to the active electrode 13 and the passive electrode 14 (S15).

The controller 12 determines whether or not the maximum value of the input voltage DCV is present in the first frequency range (S16). When the maximum value is not present at the first frequency range (NO; at S16), the controller 12 determines that either a compatible receiving device 201 has not been placed on the power transmission device 101, a compatible power receiving device has been placed on the power transmission device 101 but not at an operative position, or a foreign object, such as a metal object, has been placed on the power transmission device 101 and the process returns to the processing at S12.

When the maximum value is present at the first frequency range (YES; at S16), the controller 12 determines whether the maximum value is within a predetermined range (250 mV to 450 mV) (S17). When the maximum value is not within the predetermined range (NO; at S17), the controller 12 determines that a compatible power receiving device 201 has not been placed on the power transmission device 101, a compatible power receiving device 201 has been placed on the power transmission device 101 but not in an operative position, or a foreign object such as a metal piece has been placed on the power transmission device 101 and the process returns to the processing at S12. When the maximum value is within the predetermined range (YES; at S17), the controller 12 uses the detected maximum value as a driving frequency for performing power transmission (S18) and the controller 12 initiates power transmission at that driving frequency (S19).

The process illustrated in FIG. 6 is an example of the process executed by the controller 12 and the process executed by the controller 12 is not limited to FIG. 6.

Although a voltage is directly detected by the controller 12 in the disclosed embodiment, the controller uses that detected voltage to determine the input impedance (as a function of the detected voltage and the constant current) when the active electrode 13 side and the passive electrode 14 side of the power transmission device 101 are viewed in the power transmission device 101. That is to say, the change in the frequency characteristics of the input impedance at the time when the active electrode 13 side and the passive electrode 14 side of the power transmission device 101 are viewed, which is generated due to an external factor outside of the power transmission device 101 such as the presence of the power receiving device 201 or the foreign object such as the metal piece on the power transmission device 101, is detected as a change in the voltage, and then a decision whether or not to begin power transmission is made as a function thereof. For example, power transmission determination may be made by detecting frequency characteristics of an electric current. Furthermore, the detection position of the voltage or the current is not limited to the front and rear sides of the DC-to-AC inverter circuit 10 and the front and rear sides of the step up transformer T1, the voltage or the current may be detected at any place as long as the frequency characteristics of the input impedance when the active electrode 13 side and the passive electrode 14 side of the power transmission device 101 are viewed can be directly or indirectly detected.

Although the wireless power transmission system of the electric field coupling technique has been described in the embodiment, the wireless power transmission system is not limited to using the electric field coupling technique. For example, a magnetic field coupling technique may be employed. In such a case, an inductor will typically be used to transmit power from the power transmission device to the a power receiving device. Further, in the same manner as described above, a change in frequency characteristics of input impedance due to an external factor outside of the power transmission device (for example, the power receiving device or a foreign object such as a metal object), is detected as a change in a voltage, and then a determination whether to begin power transmission is made as a function thereof.

The invention claimed is:

1. A power transmission device for wirelessly transmitting electric power to an external device of the type which includes a first resonance circuit and first power coupling means coupled to the first resonance circuit, the power transmission device comprising:
    second power coupling means for transmitting power to the external device via the first power coupling means;
    a second resonance circuit connected to the second power coupling means;
    an alternating current generation circuit that applies an AC voltage to the second power coupling means through the resonance circuit for transmission of power to the external device; and
    a controller for:
        varying the frequency of the AC voltage generated by the alternating current generation circuit over a predetermined frequency range including a first frequency range determined by the resonant frequency of the first and second resonance circuits and a second frequency range that is below the first frequency range; and
        causing power to be applied to the external device via the second power coupling means when an input impedance of the second coupling means, as viewed from an input side of the alternating current generation circuit, meets predetermined criteria including the fact that the input impedance falls within first and second impedance ranges for the first and second frequency ranges, respectively.

2. The power transmission device according to claim 1, wherein:
    the predetermined frequency range further includes a third frequency range located between the first and second frequency ranges; and
    the predetermined criteria includes the fact that the input impedance falls within first, second and third impedance ranges for the first, second and third frequency ranges, respectively.

3. The power transmission device according to claim 2, wherein:
    the predetermined frequency range includes a fourth frequency range located above the first frequency range; and
    the predetermined criteria includes the fact that the input impedance falls within first, second, third and fourth impedance ranges for the first, second, third and fourth frequency ranges, respectively.

4. The power transmission device according to claim 2, wherein the second and third impedance ranges are both between zero and the same specified value.

5. The power transmission device according to claim 2, wherein the predetermined criteria are met when a compatible external device is placed in an operative position relative to the power transmission device.

6. The power transmission device according to claim 2, wherein the third impedance range is between zero a specified threshold value.

7. The power transmission device according to claim 3, wherein the predetermined criteria are met when a compatible external device is placed in an operative position relative to the power transmission device.

8. The power transmission device according to claim 3, wherein the second, third and fourth impedance ranges are all between zero and the same specified value.

9. The power transmission device according to claim 1, wherein the maximum value of the input impedance occurs in the first frequency range when a compatible power receiving device is placed in an operative position relative to the power transmission device.

10. The power transmission device according to claim 1, wherein the predetermined criteria are met when a compatible external device is placed in an operative position relative to the power transmission device.

11. The power transmission device according to claim 1, wherein a center frequency value of the second frequency range is half a center frequency value of the first frequency range.

12. The power transmission device according to claim 1, wherein the second impedance range is between zero a specified threshold value.

13. The power transmission device according to claim 1, wherein the predetermined criteria includes the fact that the maximum value of the input impedance occurs in the first frequency range.

14. The power transmission device according to claim 1, wherein:
- the first power coupling means of the external device comprise first and second electrodes, and
- the second power coupling means of the power transmission device comprises third and fourth electrodes adapted to make a capacitive coupling with the first and second electrodes of the external device when the external device is placed in an operative position relative to the power transmission device.

15. The power transmission device according to claim 1, wherein the alternating current generation circuit includes a direct current to alternating current (DC-to-AC) conversion circuit.

16. A wireless power transmission system comprising:
- an external power receiving device including a first resonance circuit and first power coupling means coupled to the first resonance circuit; and
- a power transmission device comprising:
    - second power coupling means for transmitting power to the external device via the first power coupling means;
    - a second resonance circuit connected to the second power coupling means;
    - an alternating current generation circuit that applies an AC voltage to the second power coupling means through the resonance circuit for transmission of power to the external device; and
    - a controller for:
        - varying the frequency of the AC voltage generated by the alternating current generation circuit over a predetermined frequency range including a first frequency range determined by the resonant frequency of the first and second resonance circuits and a second frequency range that is below the first frequency range; and
        - causing power to be applied to the external device via the second power coupling means when an input impedance of the second coupling means, as viewed from an input side of the alternating current generation circuit, meets predetermined criteria including the fact that the input impedance falls within first and second impedance ranges for the first and second frequency ranges, respectively.

17. A method for determining when to transmit power from a power transmission device to a power receiving device, the power receiving device having a first resonance circuit and first power coupling means coupled to the first resonance circuit, the power transmission device having a second power coupling means for transmitting power to the power receiving device via the first power coupling means and an alternating current generation circuit that applies an AC voltage to the second power coupling means through the resonance circuit for transmission of power to the external device; the method comprising:
- varying the frequency of the AC voltage generated by the alternating current generation circuit over a predetermined frequency range including a first frequency range determined by the resonant frequency of the first and second resonance circuits and a second frequency range that is below the first frequency range; and
- causing power to be applied to the external device via the second power coupling means when an input impedance of the second coupling means, as viewed from an input side of the alternating current generation circuit, meets predetermined criteria including the fact that the input impedance falls within first and second impedance ranges for the first and second frequency ranges, respectively.

* * * * *